United States Patent [19]
Diduck

[11] Patent Number: 5,778,861
[45] Date of Patent: Jul. 14, 1998

[54] APPARATUS AND METHOD FOR CONTROLLING THE TEMPERATURE OF A FLUID

[75] Inventor: Victor J. Diduck, 315-510 Buckland Avenue, Kelowna, British Columbia, Canada, V1Y 8B4

[73] Assignee: Victor J. Diduck, Canada

[21] Appl. No.: 798,164

[22] Filed: Feb. 10, 1997

[51] Int. Cl.[6] ............................................. F02G 5/00
[52] U.S. Cl. ...................................................... 123/557
[58] Field of Search ......................... 123/557, DIG. 12, 123/563, 568, 593, 41.08, 41.09, 41.29, 41.31, 552, 3, 541, 501

[56] References Cited

U.S. PATENT DOCUMENTS

| | | | |
|---|---|---|---|
| 4,933,077 | 6/1990 | Wolf | 123/557 |
| 5,095,879 | 3/1992 | Matsushima | 123/501 |
| 5,218,944 | 6/1993 | Leonard | 123/557 |
| 5,368,003 | 11/1994 | Clemente | 123/541 |
| 5,443,053 | 8/1995 | Johnson | 123/557 |
| 5,488,937 | 2/1996 | Kuze | 123/552 |
| 5,515,814 | 5/1996 | Cooke | 123/3 |
| 5,649,515 | 7/1997 | Fuchs et al. | 123/557 |

FOREIGN PATENT DOCUMENTS

| | | |
|---|---|---|
| 960534 | 1/1975 | Canada. |
| 1015234 | 8/1977 | Canada. |

*Primary Examiner*—Raymond A. Nelli
*Attorney, Agent, or Firm*—Myers, Liniak & Berenato

[57] ABSTRACT

An apparatus and method for dynamically controlling the temperature of a temperature controlled fluid passing through a heat exchanger where it is in thermal contact with a heat exchanging fluid by controlling accurately the volume of flow of the heat exchanging fluid through the heat exchanger.

11 Claims, 7 Drawing Sheets

APPARATUS AND METHOD FOR CONTROLLING THE TEMPERATURE OF A FLUID

FIELD

The present invention relates to an apparatus and method of dynamically controlling the temperature of a fluid using a heat exchanger and a flow control valve.

BACKGROUND

It is known that hydrocarbon based fuels such as gasoline, kerosene and diesel fuel improve significantly as fuels if they are heated up sufficiently prior to combustion so that the long chain hydrocarbons and waxes which decrease in size as the temperature is raised have a much reduced impact on limiting atomization of the fuel. Previous fuel heaters have been cumbersome and difficult to install often requiring complicated engine modifications and have focused on simply heating up the fuel rather than controlling its temperature for optimal utilization. Canadian Patent No. 960534 discloses winding the copper fuel line around a portion of a copper coolant line conducting coolant heated by the engine to preheat the gasoline prior to entering the carburetor. Canadian Patent No. 1,015,234 issued to Lebowitz et al. discloses the use of a heat exchanger and heated coolant to raise the temperature of the fuel before directing it to the carburetor.

U.S. Pat. No. 5,218,944 issued to Leonard discloses a fuel preheater which separates a portion of the fuel which it preheats in a heat exchanger and then mixes with the remaining unheated fuel under control of a microprocessor to produce a desired optimal temperature. The microprocessor is programmed to maintain minimum differential pressure between the pressure of the fuel leading to injectors to that in a fuel return line. It takes minutes for engine temperature to stabilize after a change in the mixing valve and then to check whether the car is level, whether the engine speed is constant and then to store the differential pressure. The system then adjusts the mixing valve for a hotter temperature setting and goes through the same loop.

U.S. Pat. No. 5,443,053 issued to Johnson discloses a fuel heater employing a heat exchanger in which heat is generated by both an electric immersion heater and engine heated coolant or lubricant. Johnson allows an operator monitoring fuel temperature to adjust the flow rate of the fluid medium manually by a crank to adjust the fuel temperature. Johnson also discloses use of a fluid medium modulating valve controlled by a relay to control the flow of the fluid medium. However, the nature of the control circuitry is unspecified.

Accordingly, it is an object of the invention to provide an improved apparatus and method for controlling the temperature of a fluid. It is a further object of the invention to provide an improved method and apparatus for dynamically controlling the preheating of a fuel.

SUMMARY OF THE INVENTION

According to the invention there is provided system for controlling the temperature of a fluid or gas, which includes a heat exchanger having a heat exchanging fluid inlet and outlet and temperature controlled fluid inlet and outlet. A valve having a valve closure member is mounted in one of the heat exchanging fluid inlet and outlet, and is reversibly movable from an open position to a closed position so as to gradually reduce fluid flow therethrough. An actuator coupled to the valve is operative to move the valve closure member in discrete amounts so as to change the temperature of the temperature controlled fluid by a predetermined amount in accordance with a user-defined high temperature limit TH and low temperature limit TL. A temperature measuring probe is coupled to the heat exchanger so as to measure the temperature of exiting temperature controlled fluid. A temperature sensor is coupled to the probe to compare the temperature measured by the probe to a user-defined temperature limit TH and to output a control signal when the measured temperature is greater than TH. A processor coupled to said temperature sensor and to said actuator, causes the actuator to close the valve when the temperature measured by the probe is above TH and opens the valve when it is below TL.

By controlling the flow of heat exchanging fluid at the inlet to the heat exchanger with a valve that can rapidly move from one position to the next, a fast response time in heating or cooling the controlled fluid is achieved. This permits dynamic control over a very narrow temperature range of the fuel temperature.

A display may be coupled to the controller having a display of the probe temperature, TH and TL and input controls for permitting a user to input TH and TL.

Preferably the sensor is a programmable digital thermostat.

The actuator may include a stepper motor with a valve closure member coupling for coupling with the valve. Advantageously, the valve may have a spring biased rod moveable in a direction along its axis to expose a varying fluid passageway therethrough.

In another aspect of the invention there is provided a method of controlling temperature of a controlled fluid flowing through a heat exchanger having a heat exchanging fluid flowing therethrough in thermal contact with said controlled fluid which includes sensing the temperature of controlled fluid exiting said heat exchanger, and comparing the temperature of controlled fluid TC with a high temperature limit TH. If TC is greater than TH, the volume of flow of the heat exchanging fluid is reduced by a discrete amount so that TC falls below TH. The temperature TC is compared with a low temperature limit TL and, if TC is less than TL, the volume of flow of the heat exchanging fluid is decreased by a discrete amount so that TC rises above TL.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
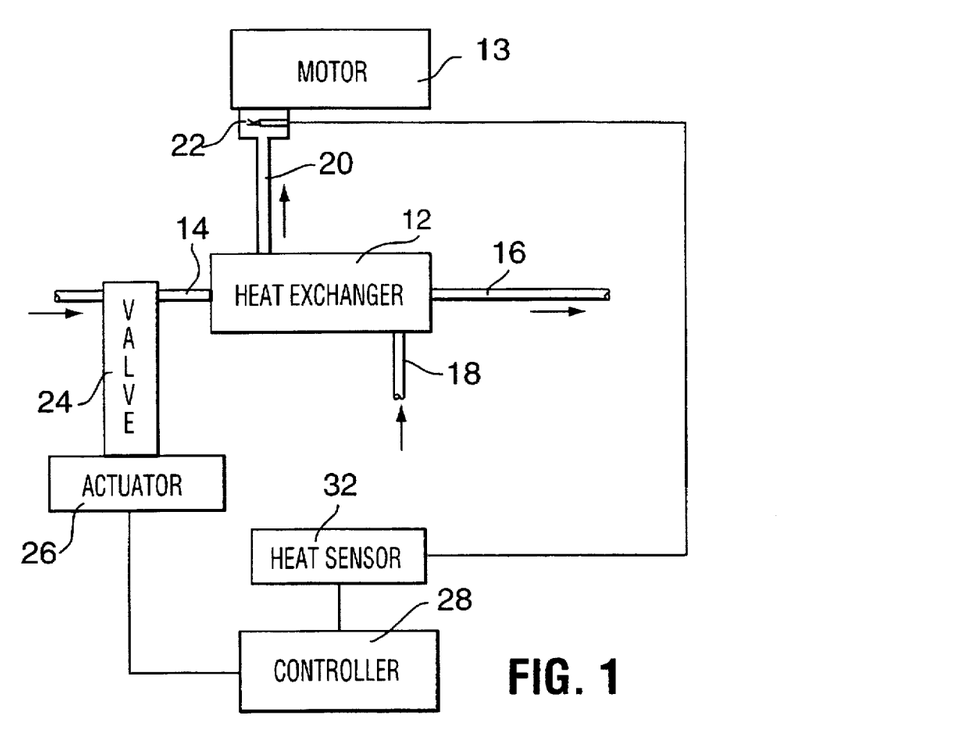
FIG. 1 is a block diagram showing the present system of preheating diesel fuel.

Referring to FIG. 1, a heat exchanger 12 has a heating fluid inlet 14, a heating fluid outlet 16, a fuel inlet 18 and a fuel outlet 20. The heat exchanger 12 places heated fluid entering through inlet 14 in thermal contact with fuel entering through fuel inlet 18 to cause heat to transfer from the heated fluid to the fuel. A valve 24 connected to the heating fluid inlet 14 controls fluid flow into the heating fluid inlet 14. An actuator 26 coupled to the valve 24 has a bi-directional motor and cam mechanism to drive the valve 24 so that it moves gradually and reversibly from a closed position to an open position. The actuator 26 is coupled to a controller 28 which controls operation of the actuator 26. A thermocouple 22 is located in the fuel outlet 20 at the point of fuel injection into an engine 13 where it develops a voltage proportional to the temperature of preheated fuel exiting from the heat exchanger 12.

A heat sensor 32 coupled to the thermocouple converts the thermocouple voltage to a digital word corresponding to the temperature sensed. The heat sensor 32 is a DS1821 programmable digital thermostat made by Dallas Semiconductor which measures temperatures from –55 degrees C. to 125 degrees C. in 1 degree C. increments and converts temperature to digital word in 1 second. Heat sensor 32 provides a thermal alarm logic output when the temperature of the device exceeds a user-defined temperature TH. Its output remains active until the temperature drops below a user-defined temperature TL, allowing for any hysteresis necessary. User defined temperatures TH and TL may be stored in non-volatile memory in the sensor 32 so that it can be programmed prior to insertion in the system. In actual fact, only TH need be provided and the unit will calculate three other offsets, one of which is TL.

Figure 2:
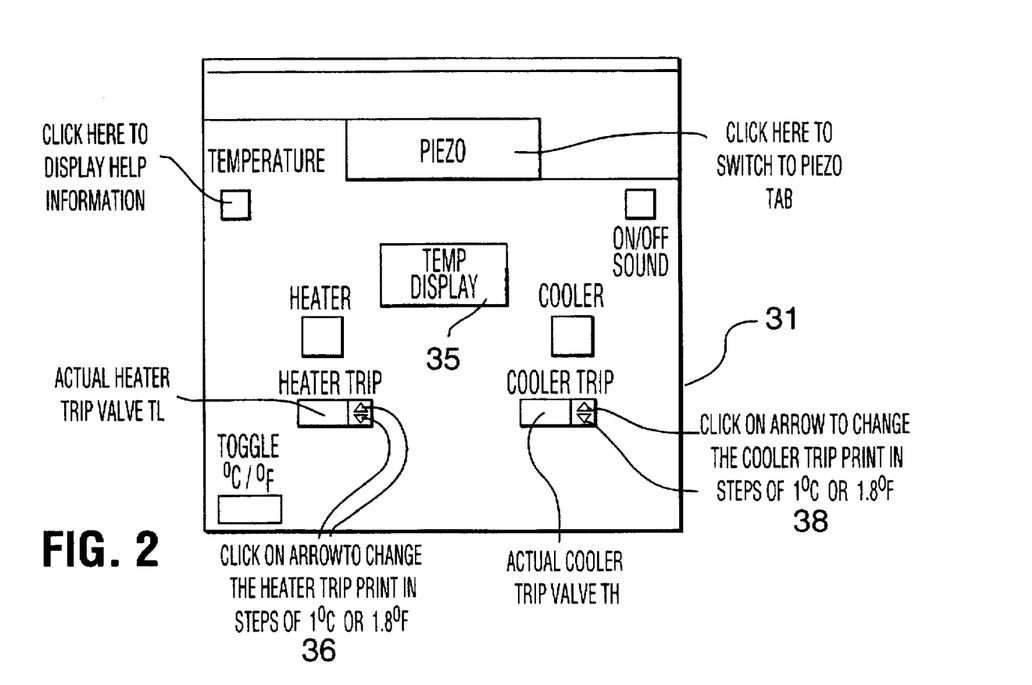
FIG. 2 is a front elevation view of the LCD display which forms part of a display module.

Once programmed, the sensor 32 is capable of fully autonomous operation. It is coupled to controller 28 to feed the controller 28 temperature data for display on a graphical user interface display 31 as seen in FIG. 2. The display 31 is a liquid crystal display which displays the sensed temperature 32, the high temperature setting TH and the low temperature setting TL. Buttons 36 and 38 on the display allow a user to change the settings of TH and TL in steps of 1 degree C.

Figures 3A, 3B, 4:
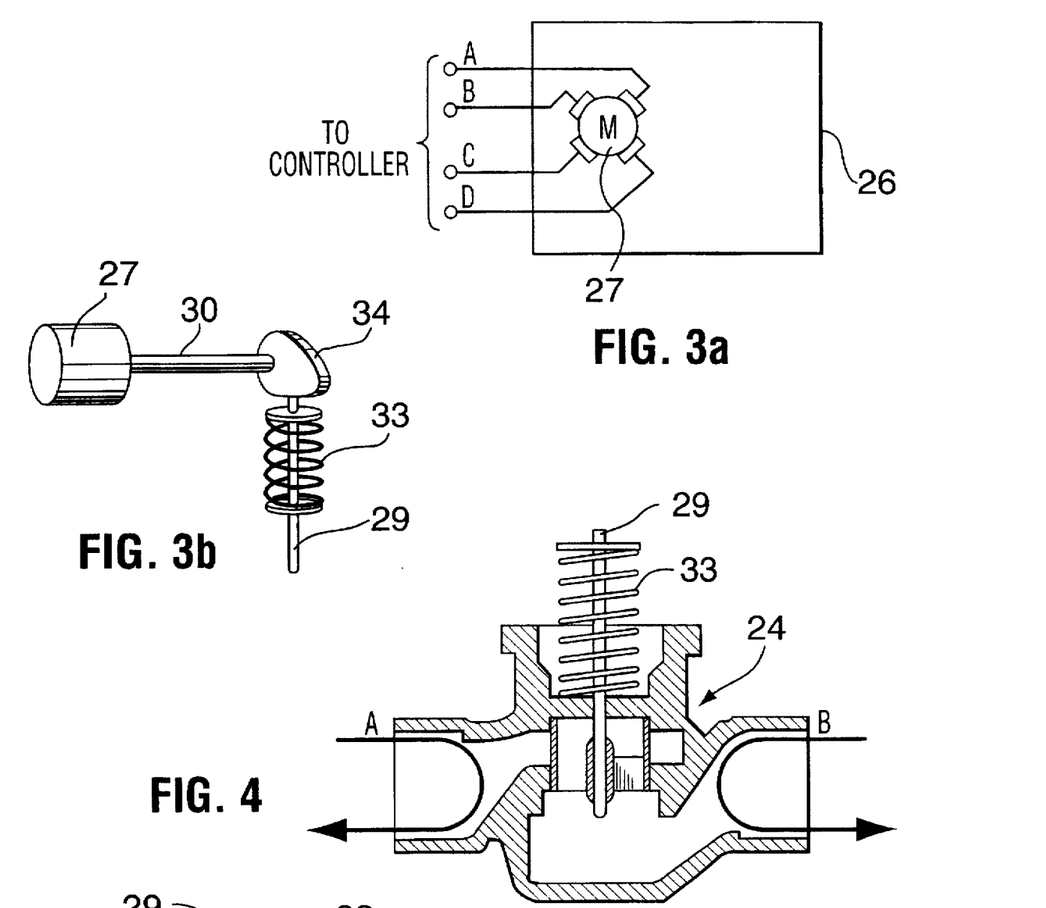
FIG. 3a is a schematic diagram of the actuator motor.
FIG. 3b is a schematic diagram of the actuator motor shaft, cam and valve stem.
FIG. 4 is a diagram of the flow control valve with the valve closed.
Figure 5:
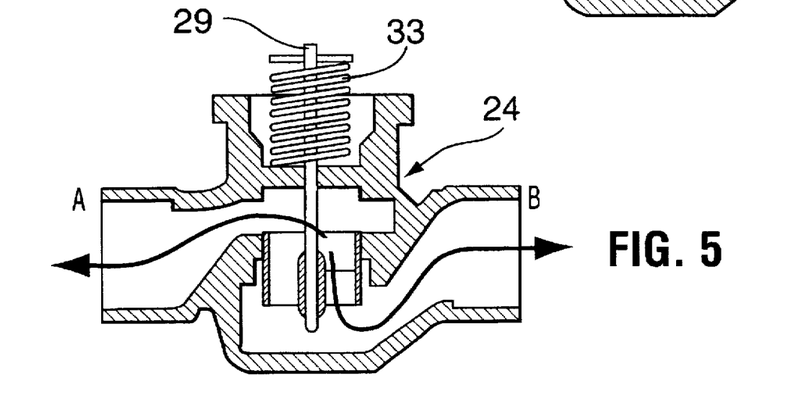
FIG. 5 is a diagram of the flow control valve with the valve open.

In order to control the preheated fuel temperature accurately and quickly it is necessary to be able to change the heating fluid flow rate quickly. This change is accomplished by a motor driven actuator 26 shown in FIG. 3a. The actuator 26 consists of a 12 volt stepper motor 27, coupled to a cam 34 which engages a valve stem 29 shown in FIG. 3b. Rotation of the motor 27 causes the cam to rotate and move the valve stem 29 up or down. The valve shown in FIGS. 4 and 5 consists of a rod or stem 29, movable along the direction of its axis which is biased towards a closed position by a helical spring 33. The rod 29 has a slotted opening which permits gradually increased fluid flow from one side of the valve 24 to the other upon gradually increased depression of the rod 29 after is has been depressed a threshold distance.

Figure 6:
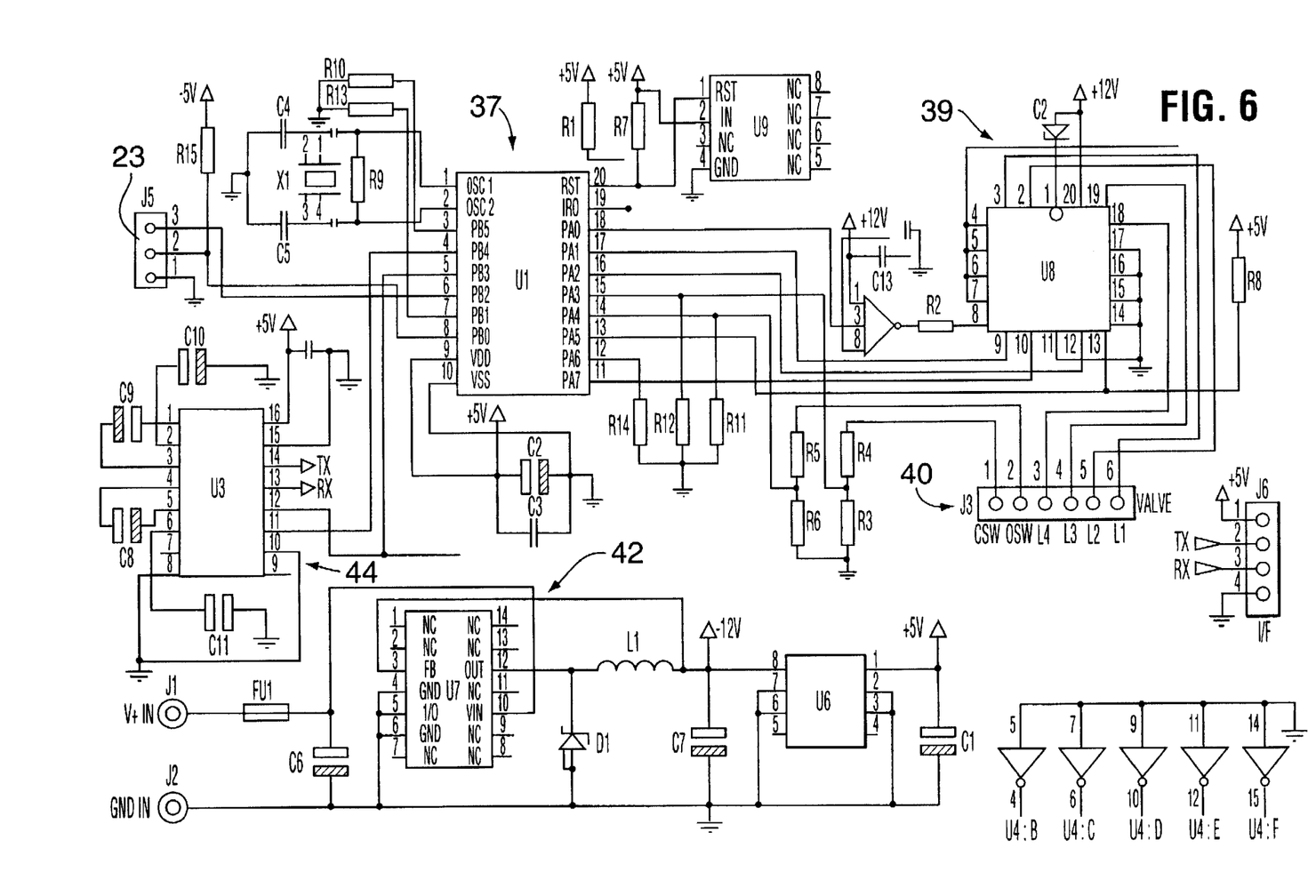
FIG. 6 is a circuit diagram of the fuel controller.

The controller circuit diagram shown in FIG. 6 consists of a processor 37 coupled to temperature sensor 32 via external leads that plug into jack 23. Temperature sensor 32 has a data In/Out lead which is coupled to the processor 28 to feed temperature information thereto. Terminals of the processor 28 are connected a stepper motor controller 39 which provides control signals for the stepper motor 27 via terminals 40. Unit 40 is a power regulator that provides regulated –12volt and +5 volt outputs for the controller.

Figure 7:
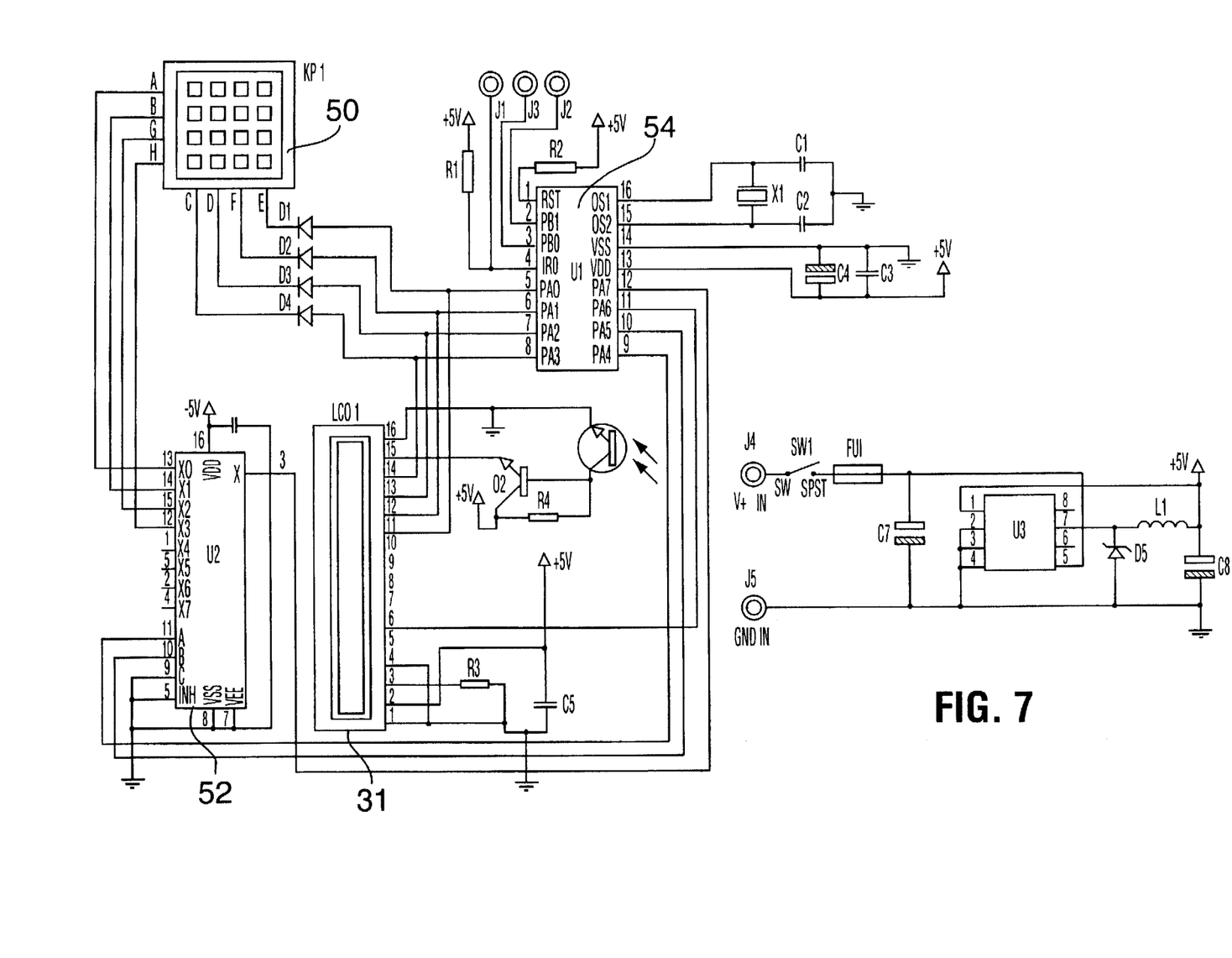
FIG. 7 is a circuit diagram of the display module.

Referring to FIG. 7 the display 31 is coupled to a processor 54 which receives from and outputs data to the latter. A keyboard 50 is coupled to the processor both through diodes D1, D2, D3, and D4 and through an driver interface 52. Terminals J1, J3 and J2 correspond and connect to terminals or jacks J5, J6, and J7 of the controller circuit shown in FIG. 6 to permit programming of the controller circuit by the display circuit.

Figure 8:
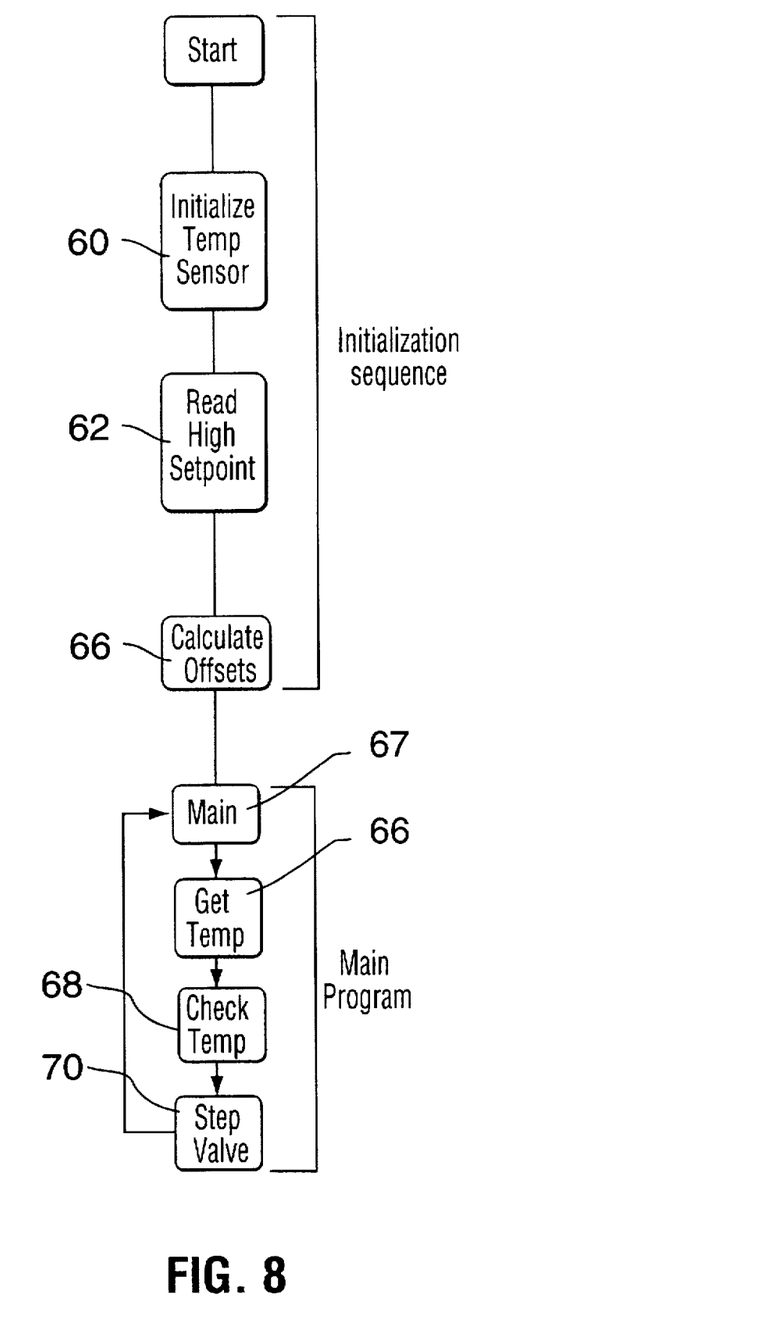
FIG. 8 is a flow diagram of the controller operation.

The operation of the system is shown in the flow diagram of FIG. 8. On startup, the temperature sensor 32 is initialized at step 60 to set up predefined parameters for its operation, including TH and TL limits, the type of communication and the format of converted data. At step 62 the high setpoint TH is stored in the temperature sensor's non-volatile memory. Three offsets based upon the high setpoint TH are calculated at step 64 giving four setpoints that cover a spread of ten degrees F. The main program is then entered at step 67 and the processor 28 continuously performs the commands within the main program. A get temp module 66 reads the current temperature from the temperature sensor 32. A check temp module 68 checks the current temperature against the four setpoints and issues the appropriate direction and distance commands to the step valve module 70. The step valve module 70 causes the actuator 26 to move to the position dictated by the check temp module 66.

Initially, when the temperature of the fuel exiting outlet 20 is below TH, heat sensor 32 sends the actual temperature as measured by thermocouple 22 to controller processor 28. Processor 28 compares this temperature with TH and signals the actuator 26 to open valve 24 and allow a greater flow of heated fluid to enter inlet 14 of heat exchanger 12. This greater flow causes more heat to be transferred to gas entering through inlet 18 and causes its temperature to rise. Eventually, the fuel temperature temperature reaches TH and controller 28 instructs actuator 26 to close valve 24 by a calculated amount. The temperature initially continues to rise due to the inertia of the system but quickly begins to drop. The response time of the system is of the order of 15 seconds. Should the temperature fall below TL, the processor 28 causes actuator 26 to open valve 24 slightly and to increase the fuel temperature. This continuous monitoring and valve adjustment permits very close dynamic control of the temperature of the preheated fuel.

Figure 9:
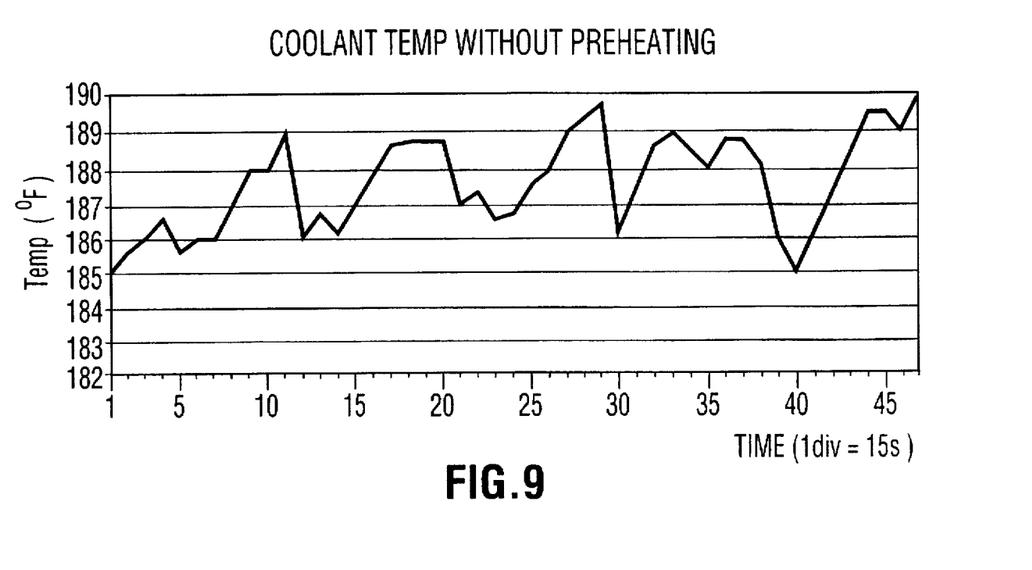
FIG. 9 is a graph of coolant temperature without preheating the fuel.

Referring to FIG. 9 there is shown how coolant temperature varies in a diesel engine with time. It will be appreciated that swings of 3 to 4 degrees F. occur in times of the order of a 1 ½ minutes. Thus, merely cooling without further control would not inherently be able to control the fuel temperature by anything better than 3 to 4 degrees F.

Figure 10:
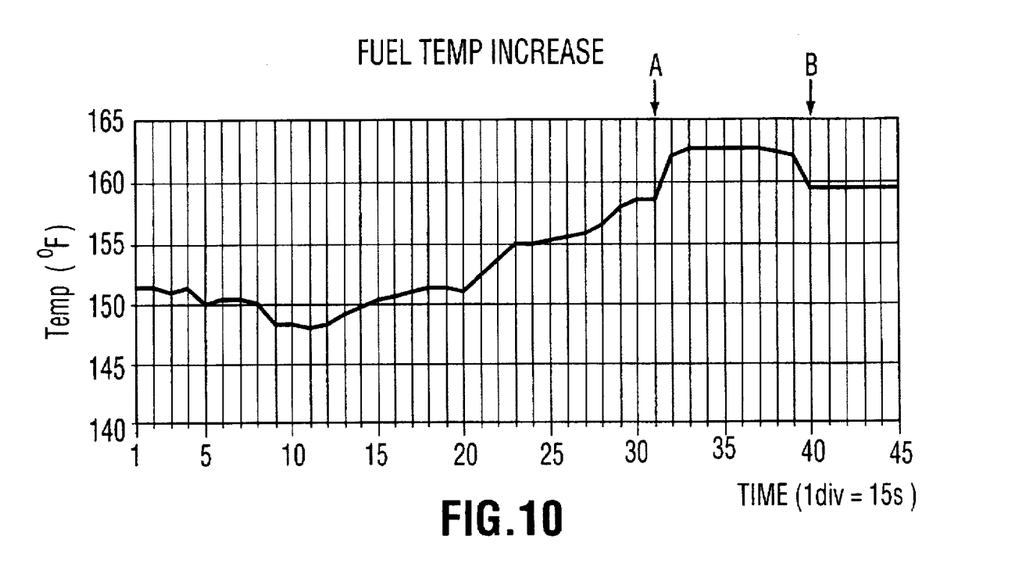
FIG. 10 is a graph of fuel temperature as a function of time both no preheating of fuel for full load, half load, idle and with preheating.

Referring to FIG. 10 there is shown fuel temperature as a function of time. From 1 to 31 on the time axis, the engine goes through full load, half load, idle and finally, at A is controlled by the present invention. The temperature is reduced at B to 159 degrees F and then at 40, 41, 42, 43 and 44, the accelerator is depressed and released right away. It will be observed that a very flat temperature curve is achieved.

Figure 11:
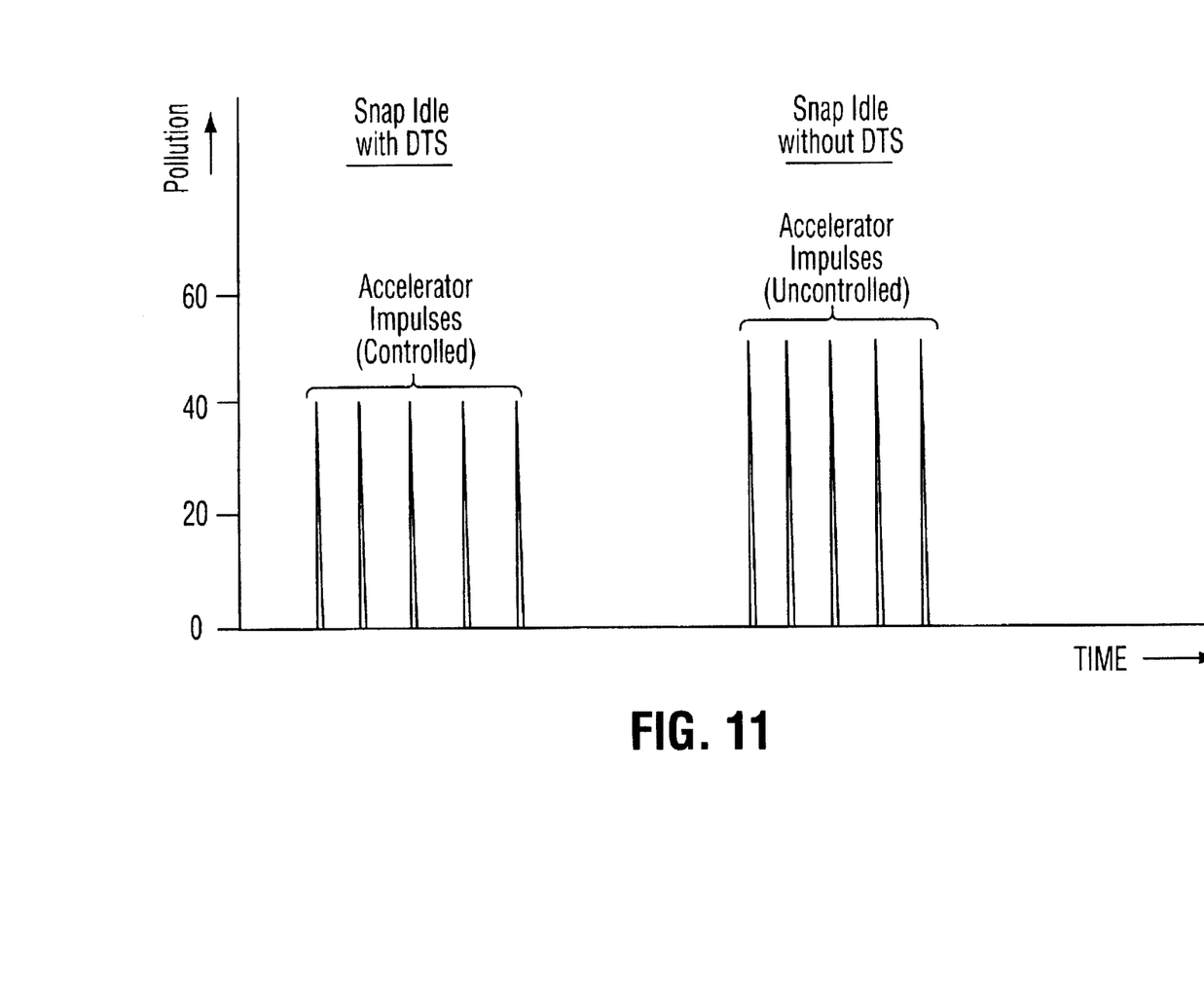
FIG. 11 show the pollution from a diesel engine in response to accelerator impulses applied at intervals of time for both a preheated fuel and for an unheated fuel.

FIG. 11 compares the diesel smoke density give off when impulsing the accelerator for first an engine in which the fuel temperature is controlled by the present system and one in which no such preheating is done. A 15 to 20% reduction output is achieved by preheating the fuel using the present system.

Results of emission testing on a Caterpillar 3406 DITA diesel engine rated at 450 horsepower at 1,800 RPM showed an $No_x$ reduction of 18% with a plate type diesel fuel heater. In addition fuel consumption was reduced by about 12%.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A system for controlling the temperature of a fluid or gas, comprising:
   (a) a heat exchanger having a heat exchanging fluid inlet and outlet and temperature controlled fluid inlet and outlet;
   (b) a valve having a valve closure member mounted in one of said heat exchanging fluid inlet and outlet, reversibly movable from an open position to a closed position so as to gradually reduce fluid flow therethrough;
   (c) an actuator coupled to said valve operative to move said valve closure member in discrete amounts so as to change the temperature of the temperature controlled fluid by a predetermined amount in accordance with a user-selected high temperature limit TH and low temperature limit TL;
   (d) a temperature measuring probe coupled to a temperature controlled fluid line connected to the temperature controlled fluid outlet from said heat exchanger so as to measure the temperature of temperature controlled fluid;
   (e) a temperature sensor coupled to said probe to compare the temperature measured by said probe to a user-selected high temperature limit TH and to output a control signal when the measured temperature is greater than the user selected high temperature limit TH and less than the user-selected low temperature limit TL; and
   (f) a processor coupled to said temperature sensor and to said actuator, operative to cause said actuator to move said valve in the direction of being closed when the temperature measured by said probe is more than TH and opens said valve when it is less than TL.

2. A system according to claim 1, including a display having a display of the probe temperature, TH and TL and input controls for permitting a user to input TH and TL.

3. A system according to claim 1, wherein said sensor is a programmable digital thermostat.

4. A system according to claim 1, wherein said actuator includes a stepper motor with a valve closure member for coupling with said valve.

5. A system according to claim 1, wherein the temperature controlled fluid is fuel.

6. A system according to claim 1, wherein said valve has a spring biased rod moveable in a direction along its axis to expose a varying fluid passageway therethrough.

7. A system according to claim 1, including an engine and wherein said thermocouple is in the fuel line proximate the point at which fuel is injected into said engine.

8. A system for dynamically controlling the temperature of a preheated fuel, comprising:
   (a) a heat exchanger having a heating fluid inlet and outlet and fuel inlet and outlet;
   (b) a valve having a valve closure member mounted in one of said heating fluid inlet and outlet, reversibly movable from an open position to a closed position so as to gradually reduce fluid flow therethrough;
   (c) a stepping motor coupled to said valve operative to move said valve closure member in discrete amounts so as to change the temperature of the heated fluid by a predetermined amount in accordance with a user-defined high temperature limit TH and low temperature limit TL;
   (d) a temperature measuring probe coupled to said heat exchanger so as to measure the temperature of exiting preheated fuel;
   (e) a programmable digital thermostat coupled to said probe to compare the temperature measured by said probe to a user-defined temperature limit TH and to output a control signal when the measured temperature is greater than TH; and
   (f) a processor coupled to said temperature sensor and to said stepping motor, operative to cause said stepping motor to close said valve when the temperature measured by said probe is above TH and opens said valve when it is below TL.

9. A method of controlling temperature of a controlled fluid flowing through a heat exchanger having a heat exchanging fluid flowing therethrough in thermal contact with said controlled fluid, comprising:
   (a) sensing the temperature of the controlled fluid, TC, exiting said heat exchanger;
   (b) comparing TC with a high temperature limit, TH;
   (c) reducing the volume of flow of the heat exchanging fluid by a discrete amount if TC is greater than TH so that TC falls below TH;
   (d) comparing TC with a low temperature limit, TL; and
   (e) increasing the volume of flow of the heat exchanging fluid by a discrete amount if TC is less than TL so that TC rises above TL.

10. A method according to claim 9, wherein the controlled fluid is fuel.

11. A method according to claim 9, wherein the volume of flow of the heat exchanging fluid is reduced using a valve in a controlled fluid inlet to the heat exchanger and controlling the valve with a controller and a stepping motor.

* * * * *

UNITED STATES PATENT AND TRADEMARK OFFICE
CERTIFICATE OF CORRECTION

PATENT NO.  : 5,778,861
DATED       : Jul. 14, 1998
INVENTOR(S) : Victor J. Diduck It is certified that error appears in the above-identified patent and that said Letters Patent is hereby corrected as shown below:

Column 2, line 3, delete "user-defined" and substitute --user-selected--;
        lines 8 and 9, delete "user-defined" and substitute --user-selected--.
Column 3, line 25, delete "heat" and substitute --temperature--;

line 46, delete "32";
        line 57, delete "stem" and substitute --rod--;
        line 58, delete "or stem".
Column 4, line 34, delete "heat" and substitute --temperature--.

Claim 7, line 2, after "said" insert --temperature measuring probe is a--;
        after "thermocouple" delete "is".

Claim 8, line 32, after "said" delete "temperature sensor" and insert --programmable digital thermostat".

Signed and Sealed this

Second Day of March, 1999

Attest:

Q. TODD DICKINSON

*Attesting Officer*       *Acting Commissioner of Patents and Trademarks*